(12) United States Patent
Yang et al.

(10) Patent No.: US 7,274,654 B2
(45) Date of Patent: Sep. 25, 2007

(54) METHOD FOR SHARING BACKUP PATH IN MPLS NETWORK, LABEL SWITCHING ROUTER FOR SETTING UP BACKUP IN MPLS NETWORK, AND SYSTEM THEREFOR

(75) Inventors: Mi-jung Yang, Daejon (KR); Byung-chun Jeon, Daejon (KR); Yoo-kyoung Lee, Daejon (KR)

(73) Assignees: Electronics and Telecommunications Research Institute (KR); Korea Telecom (KR)

( * ) Notice: Subject to any disclaimer, the term of this patent is extended or adjusted under 35 U.S.C. 154(b) by 1044 days.

(21) Appl. No.: 10/175,926

(22) Filed: Jun. 20, 2002

(65) Prior Publication Data

US 2003/0152024 A1 Aug. 14, 2003

(30) Foreign Application Priority Data

Feb. 9, 2002 (KR) .................. 2002-7683

(51) Int. Cl.
*G08C 15/00* (2006.01)
(52) U.S. Cl. ..................... 370/217; 370/228
(58) Field of Classification Search ........ 370/216–220, 370/225, 228
See application file for complete search history.

(56) References Cited

U.S. PATENT DOCUMENTS

2002/0105904 A1* 8/2002 Hauser et al. ............. 370/218
2002/0172149 A1* 11/2002 Kinoshita et al. .......... 370/216
2002/0172150 A1* 11/2002 Kano ........................ 370/216
2003/0018812 A1* 1/2003 Lakshminarayana et al. .... 709/241
2003/0063560 A1* 4/2003 Jenq et al. .................. 370/216
2003/0063613 A1* 4/2003 Carpini et al. .............. 370/401

FOREIGN PATENT DOCUMENTS

JP 9018492 1/1997

OTHER PUBLICATIONS

Sykim, Mychung, Shyang, Leeyk; Etri.r.kr, Nov. 28, 2000, "CR-LSP Fault Tolerant Mechanism for Real Time Traffic Transmission on MPLS network", S. Kim, et al., 14 pages.

* cited by examiner

*Primary Examiner*—Hassan Kizou
*Assistant Examiner*—Bo Hui A. Zhu
(74) *Attorney, Agent, or Firm*—Blakely Sokoloff Taylor & Zafman

(57) ABSTRACT

A method for sharing a backup path in a MultiProtocol Label Switching (MPLS) network, a label switching router (LSR) for setting a backup path in an MPLS network, a system for setting a backup path in an MPLS network, and a recording medium therefor are provided. The method includes the steps of acquiring link configuration information of links included in a working path when the working path is set between a source node and a destination node, and allocating bands for a backup path using the link configuration information when the backup path is set between the source node and the destination node. In the method, an optimal band is allocated to each of links included in a backup path by calculating a band using information, which is obtained during setting of a working path, about at least one other working path sharing links with the working path when the backup path is set, thereby efficiently managing network resources without wasting them.

11 Claims, 9 Drawing Sheets

METHOD FOR SHARING BACKUP PATH IN MPLS NETWORK, LABEL SWITCHING ROUTER FOR SETTING UP BACKUP IN MPLS NETWORK, AND SYSTEM THEREFOR

BACKGROUND OF THE INVENTION

1. Field of the Invention

The present invention relates to a method for sharing a backup path in a MultiProtocol Label Switching (MPLS) network, a label switching router (LSR) for setting a backup path in an MPLS network a system for setting a backup path in an MPLS network, and a recording medium therefor.

2. Description of the Related Art

In order to completely recover a failure occurring in a link on a working path satisfying band conditions typically given in an MPLS network, it is necessary to disjoint the working path and joint another path referred to as a backup path satisfying the band conditions of the working path.

The conception of an MPLS network in which a backup path is not shared will be described with reference to FIG. 1.

A label switched path (LSP) L1 103 denoting a working path (represented by a solid line) between a source LSR1 101 and a destination LSR12 102 is set via LSR3-LSR6-LSR8, and a backup path (represented by a dotted line), LSP L1b 104, which is disjointed from the L1 is set as LSR1-LSR4-LSR5-LSR9-LSR10-LSR12. In addition, a working path LSP L2 106 is set between a source LSR2 105 and a destination LSR12 102 via LSR7-LSR11, and a backup path LSP L2b 107 disjointed from the L2 is set as LSR2-LSR5-LSR9-LSR10-LSR12.

Here, the L1b and the L2b pass through the same links while passing a path LSR5-LSR9-LSR10-LSR12. However, since conception of band sharing between backup paths is not defined, bands for both backup paths should be guaranteed, respectively, at each of the links. When it is assumed that only single link failure occurs at one time in a single network, the backup paths L1b and L2b are not simultaneously used since a failure does not occur in the L1 and L2 at the same time. Nevertheless, bands for both backup paths L1b and L2b are maintained, wasting network resources.

The above-described single link failure is based on the following facts Generally, a backup path is set to a less optimal path than a working path and is temporarily used until the working path is restored, so the backup path is used for a short period of time. A probability of failures occurring in a plurality of links for that short period of time is very low. In addition, maintaining a plurality of backup paths to restore a plurality of link failures occurring simultaneously results in significant waste of network resources, so it is reasonable to consider only a single link failure to be recovered without considering a plurality of link failures.

It is also waste of resources to set backup paths for every working path to recover a temporary failure. To compensate for this waste, it is necessary for the backup paths of working paths passing through different links to share a band. In other words, when a single link failure occurs in a single network, discontinuation of a service occurs only a single working path. In this circumstances, a working path having a failure can be completely restored even if the backup path of the working path shares a band with the backup paths of other working paths.

The conception of an MPLS network in which a backup path is shared will be described with reference to FIG. 2.

Link configuration of each path shown in FIG. 2 is the same as in FIG. 1. However, a bandwidth allocated to links through which working paths L1b and L2b pass in a section LSR5-LSR9-LSR10-LSR12 greatly decreases as compared to the case of FIG. 1. In other words, generally, failures do not simultaneously occur in both working paths L1 and L2, so a band allocated to the same link through which the backup paths L1b and L2b of the respective working paths L1 and L2 pass is set to a maximum, MAX(L1b, L2b) 201, between bands required by the two backup paths L1b and L2b. Accordingly, even if a failure occurs in the working path L1 or L2, the corresponding backup path L1b or L2b has an enough band to recover the working path L1 or L2.

However, backup paths can share a band only when the corresponding working paths are disjointed from each other. In other words, when a failure occurs in one link, the backup paths of all working paths passing through the link must not share a band, and the sum of bandwidths of the working paths must be guaranteed for a backup path. In order to guarantee a backup path in such circumstances, information about link configurations of all paths set currently must be reported to all nodes and managed continuously.

In other words, all nodes must recognize and manage information about configurations of all working paths and backup paths which are previously set, that is, link information of each of the paths, bandwidth information allocated to the working paths, and bandwidth information allocated to the backup paths. The quantity of information that must be maintained and managed is so enormous that traffic for reporting the information to all of the nodes causes a network service to fail. In addition, each of the node is burdened with a large quantity of loads. Accordingly, it is impossible to exactly allow backup paths to share a band in conventional researches.

SUMMARY OF THE INVENTION

To solve the above-described problems, it is an object of the present invention to provide a method for sharing a backup path in a MultiProtocol Label Switching (MPLS) network by allowing backup paths to share a band using a path setting signaling without managing path configuration information, thereby efficiently using network resources, a label switching router for setting a backup path in an MPLS network, a system for setting a backup path in an MPLS network, and a recording medium therefor.

To achieve the above object of the present invention, in one embodiment, there is provided a method for sharing a backup path in an MPLS network. The method includes the steps of acquiring link configuration information of links included in a working path when the working path is set between a source node and a destination node; and allocating bands for a backup path using the link configuration information when the backup path is set between the source node and the destination node.

Preferably, the step of acquiring the link configuration information is performed using a label allocation request message and a label mapping message.

Preferably, the link configuration information is information about at least one other working path sharing the links with the currently set working path.

Preferably, the step of allocating the bands for the backup path is performed using information about a backup path of at least one other working path sharing the links with the currently set working path and information about a backup path previously allocated to each of the links of the currently set backup path.

In another embodiment, there is provided a method for sharing a backup path in an MPLS network. The method includes the steps of setting a working path between a source node and a destination node, and allocating bands for a backup path of the set working path taking into account a backup path of other working path sharing a link with the set working path when the backup path of the set working path is set.

Preferably, the step of setting the working path includes a step in which the source node transmits a label allocation request message to an intermediate node included in the working path, a step in which the intermediate node adds information about at least one other working path, which shares a link with the intermediate node, to the received label allocation request message and transmits the label allocation request message with the added information to the destination node, and a step in which the destination node receives the label allocation request message with the added information about the at least one other working path, adds the received information about the at least one other working path to a label mapping message, and transmits the label mapping message with the information about the at least one other working path back to the source node through the intermediate node.

Preferably, the step of allocating the bands for the backup path includes a step in which the source node computes the backup path corresponding the set working path, a step in which the source node transmits a label allocation request message including information about the backup path of at least one other working path sharing a link with the set working path to an intermediate node included in the currently set backup path, and a step in which the intermediate node allocates a band for the currently set backup path using the received information about the backup path of the at least one other working path sharing a link with the set working path.

Preferably, the step of allocating a band for the currently set backup path is performed using information about a backup path previously allocated to the intermediate node and the information included in the received label allocation request message.

Preferably, the step of allocating a band for the currently set backup path includes additionally allocating a band corresponding to a difference, i.e., (a necessary band—a band previously allocated for an existing backup path), when the band previously allocated for the existing backup path is less than the necessary band that is the sum of a band for a path, which is included in both a set of backup paths previously allocated to the intermediate node and the information included in the label allocation request message, and a band for the currently set backup path.

To achieve the above object of the present invention, there is also provided a label switching router for setting a backup path in an MPLS network. The label switching router includes a path computation unit for computing a working path and a backup path and transmitting a path setting request message to a signaling unit, a backup path search unit for receiving a label mapping message including information about at least one other working path sharing at least one link with the currently computed working path and searching a backup path of the at least one other working path using information about the at least one other working path, a signaling unit for transmitting a label allocation request message for setting the currently computed working path and a label allocation request message which includes information about the backup path searched by the backup path search unit for setting the currently computed backup path, and a backup path band allocation unit for allocating a band for the currently computed backup path using the information about the backup path searched by backup path search unit and information about a path previously allocated to the label switching router.

There is also provided a system for setting a backup path in an MPLS network. The system includes a source router for receiving a label mapping message including information about at least one existing working path sharing at least one link with a current working path, searching information a about backup path of the at least one existing working path, adding the information about the searched backup path to a label allocation request message for setting a backup path, and transmitting the label allocation request message with the information to an intermediate node; and an intermediate router for allocating a band for the backup path to be set using the information added to the label allocation request message received from the source router and path information previously stored therein.

There is also provided a computer readable recording medium in which a program for allowing one of the above methods to be executed on a computer is recorded.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Hereinafter, a preferred embodiment of the present invention will be described in detail with reference to FIGS. 3 through 9.

Figure 1:
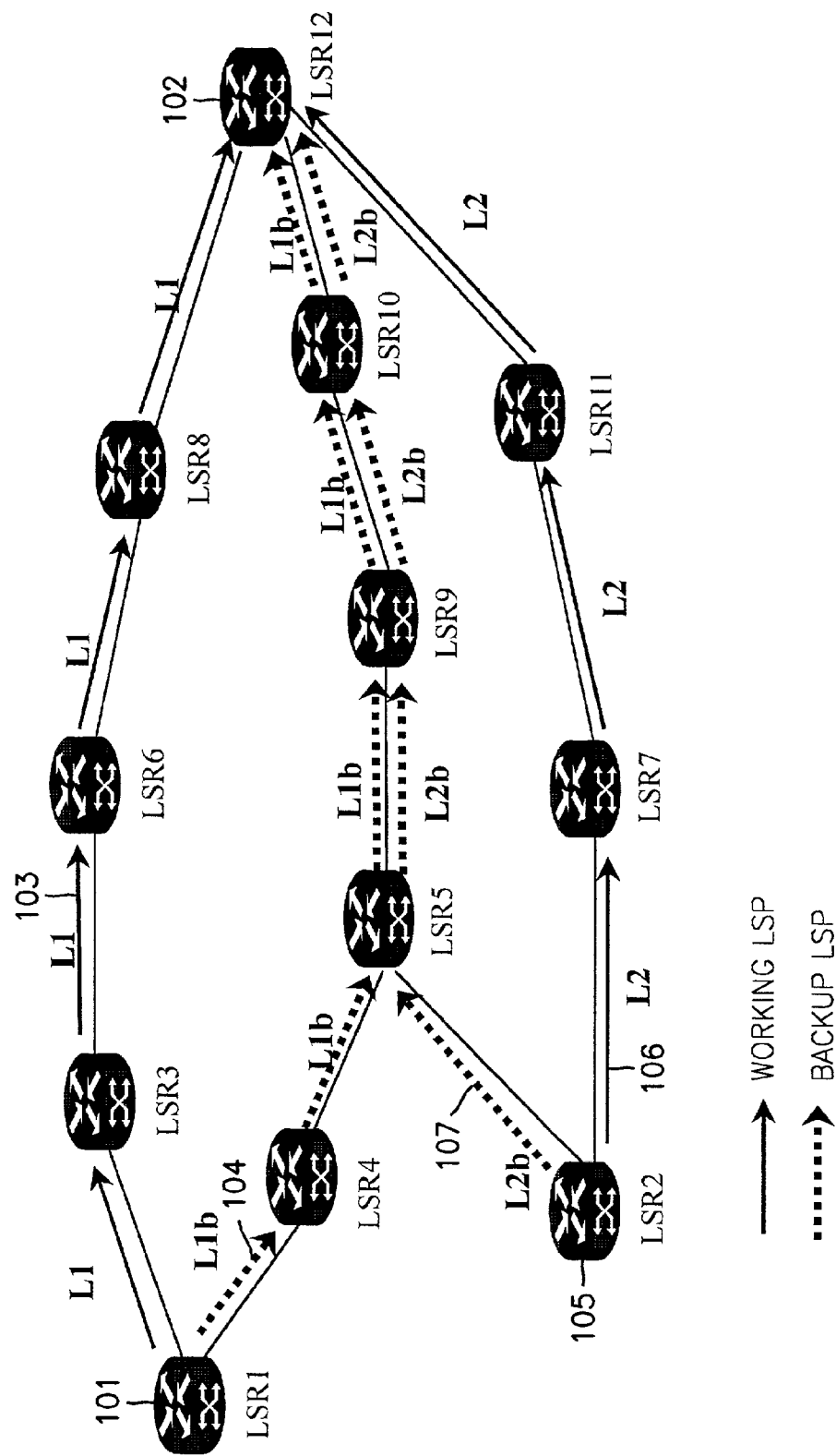
FIG. 1 is a diagram of the conception of a MultiProtocol Label Switching (MPLS) network in which a backup path is not shared.
Figure 2:
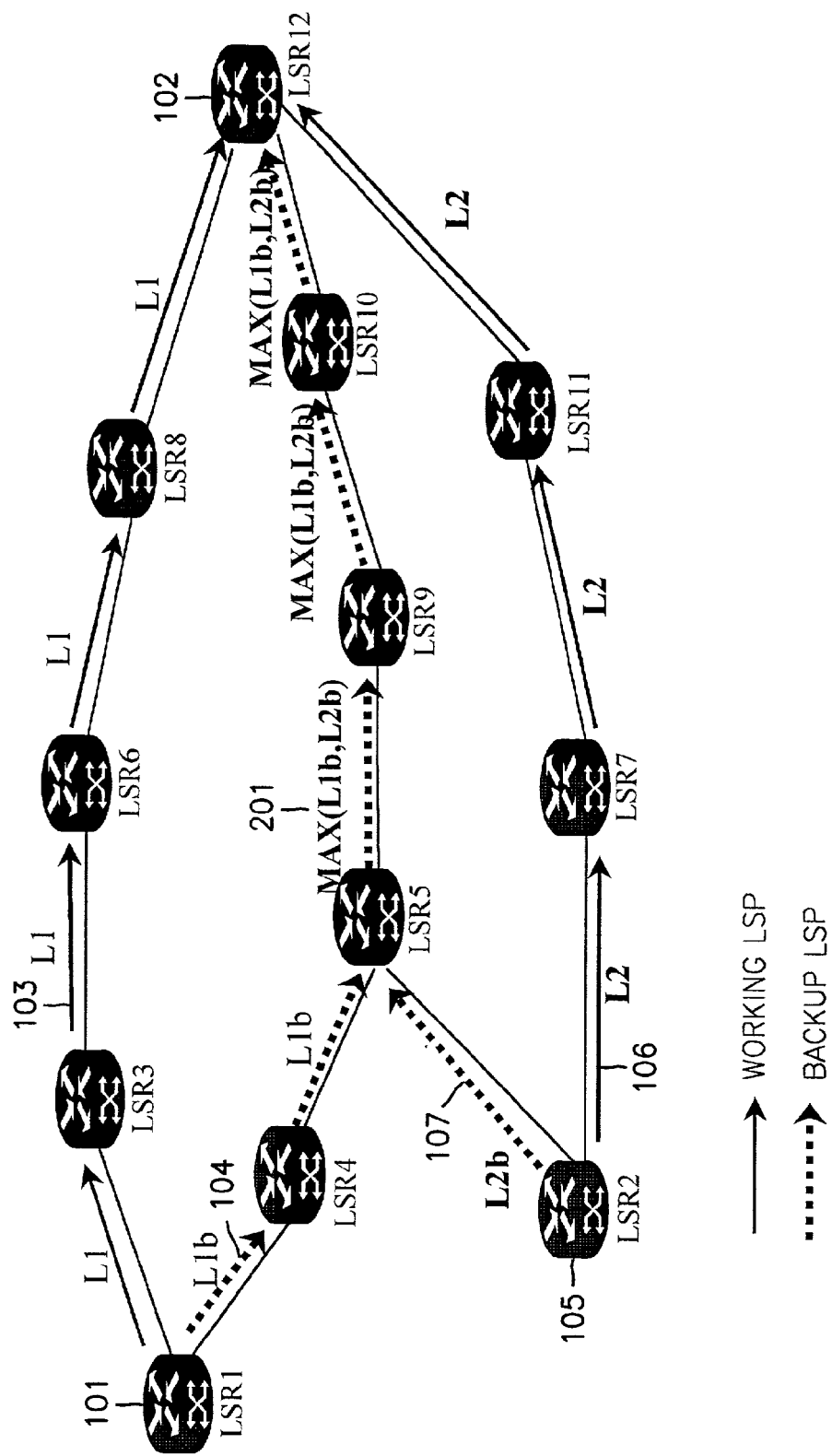
FIG. 2 is a diagram of the conception of an MPLS network in which a backup path is shared.
Figure 3:
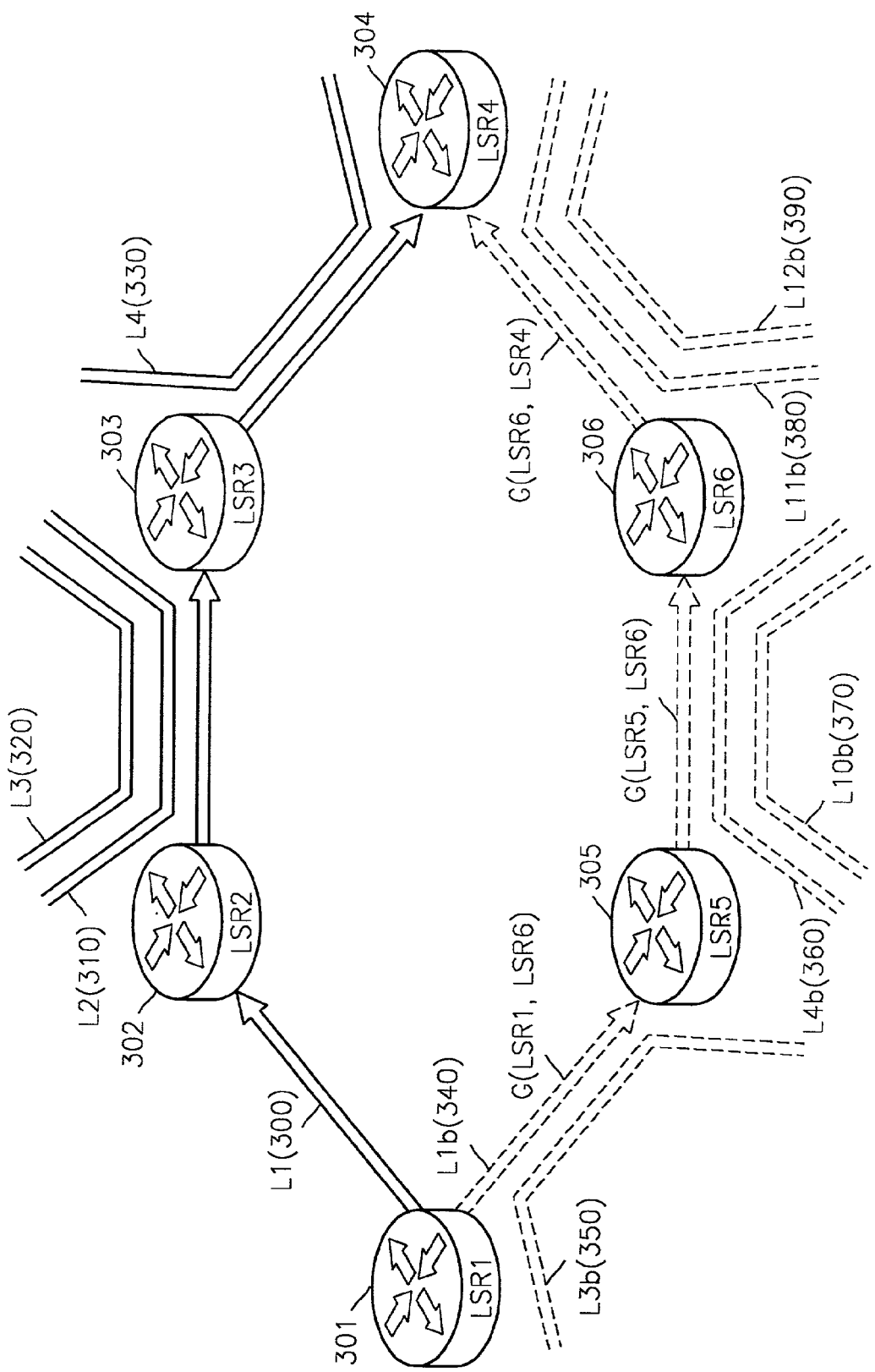
FIG. 3 is a diagram of an example of an MPLS network in which a backup path is shared using link configuration information on a path according to the present invention.

FIG. 3 is a diagram of an example of a MultiProtocol Label Switching (MPLS) network in which a backup path is shared using link configuration information on a path according to the embodiment of the present invention.

The MPLS network shown in FIG. 3 includes a source node, i.e., a label switching router1 (LSR1) 301, intermediate nodes, i.e., LSR2 302, LSR3 303, LSR5 305, and LSR6 306, and a destination node, i.e., LSR4 304. A working path L1 300 requires a band b=10 and is to be set to <LSR1-LSR2-LSR3-LSR4>. The working path L1 includes links shared with other working paths. As shown in FIG. 3, working paths L2 310 and L3 320 pass a link <LSR2-LSR3>, and a working path L4 330 passes a link <LSR3-LSR4>.

A backup path L1b 340 of the working path L1 is set to <LSR1-LSR5-LSR6-LSR4>. A backup path L3b 350 of the working path L3 passes a link <LSR1-LSR5>, which is shared with the backup path L1b. Backup paths L4b 360 and L10b 370 of the working paths L4 and L10, respectively, pass a link <LSR5-LSR6>, which is shared by the backup path L1b. Backup paths L11b 380 and L12b 390 of working paths L11 and L12, respectively, pass a link <LSR6-LSR4>, which is shared by the backup path L1b. A backup path L2b of the working path L2 does not share any link with backup path L1b 340 and is therefore not shown in FIG. 3.

A link along L1b that is shared with at least one of the backup paths and L4b is allocated a band which is at least the sum of bandwidths required for the backup paths L1b, L3b, and L4b that share the link. The link is allocated an existing band if the existing band is greater than the sum. A link along L1b that is not shared with either of L3b and L4b is allocated a bandwidth which is the greater between the existing band and a bandwidth for the backup path L1b. The term "existing backup path" refers to the backup path(s) of one or more working paths that do not share any link, or overlap, with L1, but the backup path(s) share the link with L1b. The term "existing band" refers to the bandwidth of the existing backup path. The process of bandwidth allocation will be described in greater detail with reference to FIG. 9.

Since the backup path L3b has been using the link <LSR1-LSR5>, (band for L3b)+(band for L1b) is allocated to the link <LSR1-LSR5>. Accordingly, if it is assumed that a band for each of all paths in FIG. 3 is 10, a band G(LSR1, LSR5) of 20 is allocated to the link <LSR1-LSR5>.

The backup paths L4b and L10b pass the link <LSR5-LSR6> on the backup path L1b. Accordingly, the greater one between an existing band G(LSR5, LSR6) and {(band for L4b)+(band for Lb)}, that is, 20, is allocated to the link <LSR5-LSR6>as G(LSR5, LSR6) for the backup path L1b.

Although the backup paths L11b and L12b pass the link <LSR6-LSR4> on the backup path L1b, the two backup paths L11b and L12b are not related to the working path L1. Accordingly, the greater one between an existing band G(LSR6, LSR4) and a band for the backup path L1b, that is, 20, is allocated to the link <LSR6-LSR4> as G(LSR6, LSR4) for the backup path L1b.

Figure 4:
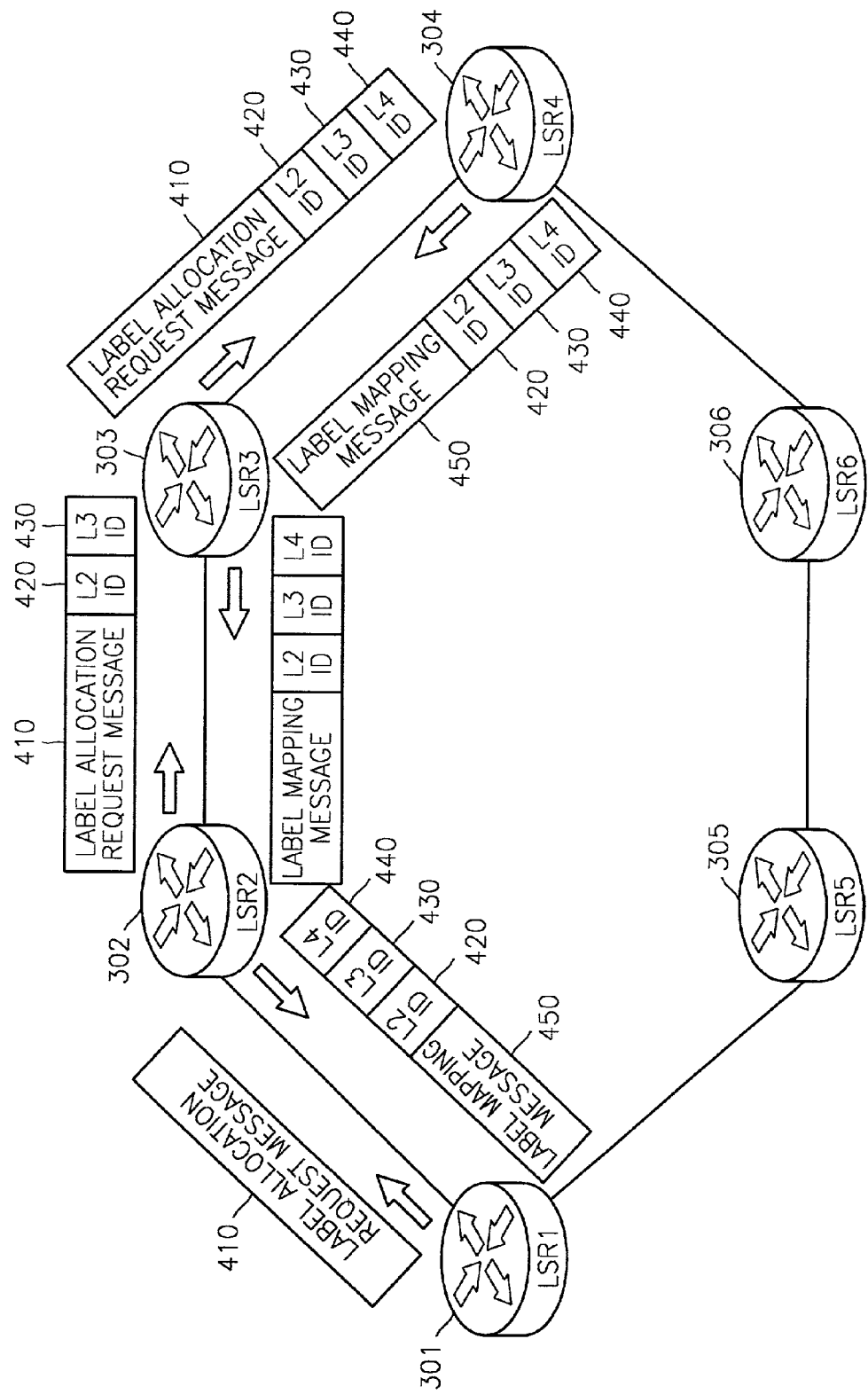
FIG. 4 is a diagram illustrating a procedure for setting a working path in a method for sharing a backup path in the MPLS network shown in FIG. 3.

A procedure for setting a working path in a method for sharing a backup path in the MPLS network shown in FIG. 3 will be described with reference to FIG. 4.

In order to allocate an optimal bandwidth to a backup path set between LSR1 and LSR4 of FIG. 3 without wasting resources, link configuration information output from intermediate nodes is used for setting a working path between LSR1 and LSR4.

When the source LSR1 301 sets a working path to the LSR4, the LSR1 transmits a label allocation request message 410 to the intermediate LSR2 302. Then, the LSR2 adds information L2 ID 420 and L3 ID 430 about other working paths, LSP2 and LSP3, which are previously set in the LSR2, to the received label allocation request message 410 and transmits the label allocation request message 410 with added information to the intermediate LSR3 303. The information L2 ID 420 and L3 ID 430 about the working paths, LSP2 and LSP3, have been stored in a path information table (not shown) within the LSR2. Then, the LSR3 adds information L4 ID 440 about another working path, LSP4, previously set therein to the label allocation request message 410 with the information L2 ID 420 and L3 ID 430 and transmits the label allocation request message 410 with the added information to the destination LSR4 304. Therefore, the destination LSR4 304 has configuration information of all links on a working path being set currently.

Thereafter, the destination LSR4 304 adds the received link configuration information L2 ID 420, L3 ID 430, and L4 ID 440 to a label mapping message 450 and transmits the label mapping message 450 with the link configuration information L2 ID 420, L3 ID 430, and L4 ID 440 back to the LSR3. Then, the received label mapping message 450 and the information L2 ID 420, L3 ID 430, and L4 ID 440 are transmitted through the intermediate nodes LSR3 and LSR2 to the source LSR1. As a result, the source LSR1 has configuration information of all links on the currently set working path and can guarantee an optical bandwidth necessary for setting a backup path based on the link configuration information.

Figure 5:
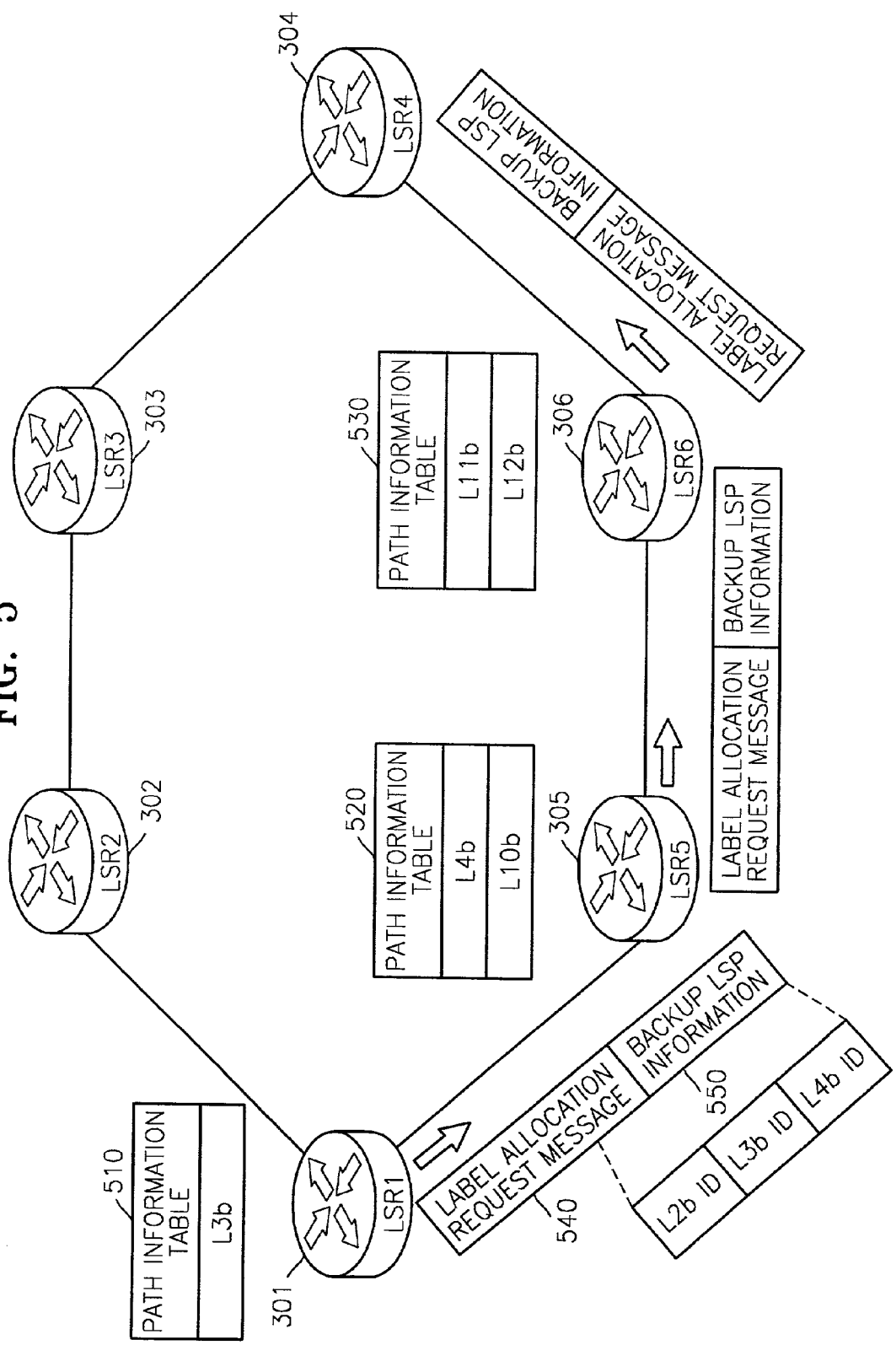
FIG. 5 is a diagram illustrating a procedure for setting a backup path in a method for sharing a backup path in the MPLS network shown in FIG. 3.

A procedure for setting a backup path in a method for sharing a backup path in the MPLS network shown in FIG. 3 will be described with reference to FIG. 5.

It is assumed that the LSR1 obtains a path <LSR1-LSR5-LSR6-LSR4> as a result of computing a backup path. Each LSR has a path information table storing path information which is set for a link connected to the LSR. The LSR1 has a path information table 510 containing information about the path L3b set to the link <LSR1-LSR5>. The LSR5 has a path information table 520 containing information about the paths L4b and L10b set to the link <LSR5-LSR6>. The LSR6 has a path information table 530 containing information about the paths L11b and L12b set to the link <LSR6-LSR4>.

Before transmitting a label allocation request message 540 to the intermediate LSR5, the LSR1 searches backup path information with respect to the working paths L2, L3, and L4, that is, backup LSP information 550 including link configuration information of all links included in the working path L1. Thereafter, the LSR1 allocates a bandwidth to the link <LSR1-LSR5> using the searched backup path information L2b ID, L3b ID, and L4b ID and path information contained in its path information table 510. Then, the LSR1 transmits the label allocation request message 540 with the backup path information L2b ID, L3b ID, and L4b ID to the intermediate LSR5.

The intermediate LSR5 receives the label allocation request message 540 and the backup LSP information 550 and operates in the same manner as the LSR1. In other words, the LSR5 allocates a bandwidth to the link <LSR5-LSR6> using the received backup LSP information 550 and path information stored in its path information table 520 and transmits the label allocation request message 540 and the backup LSP information 550 to the LSR6 as they are. Similarly, the LSR6 allocates a bandwidth to the link <LSR6-LSR4> using the received backup LSP information 550 and path information stored in its path information table 530 and transmits the label allocation request message 540 and the backup LSP information 550 to the destination LSR4 as they are. On receiving the label allocation request message 540, the LSR4 generates a label mapping message. The label mapping message is transmitted back to the source LSR1 through the intermediate nodes LSR6 and LSR5.

With such arrangement, when setting a backup path, the LSR1 can guarantee an optimal bandwidth without wasting resources using link configuration information obtained during setting of a working path.

Figure 6:
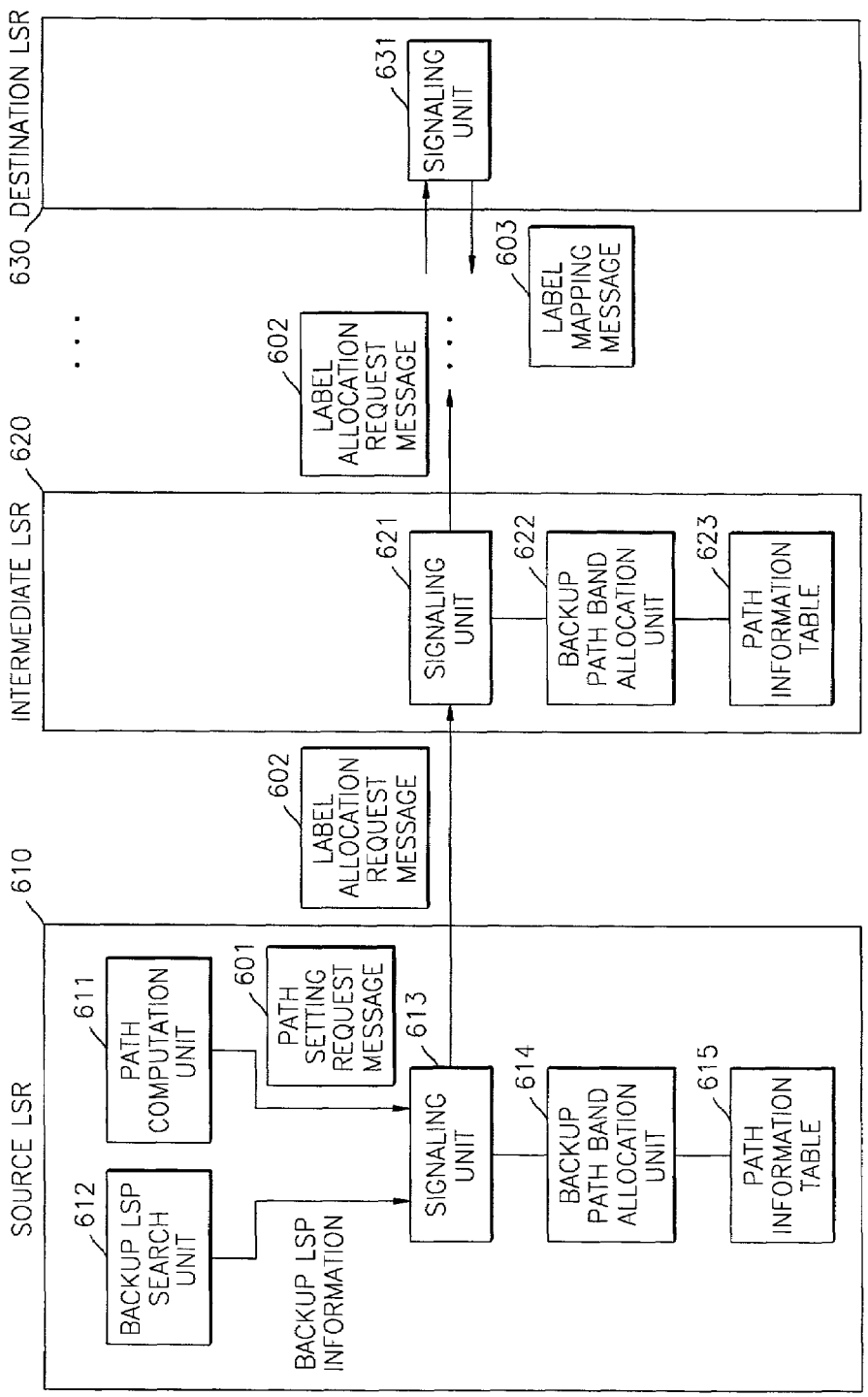
FIG. 6 is a schematic block diagram of the structures of a source label switching router (LSR), an intermediate LSR, and a destination LSR which are used for a method for sharing a backup path according to the present invention.

FIG. 6 is a schematic block diagram of the structures of a source LSR, an intermediate LSR, and a destination LSR which are used for a method for sharing a backup path according to the present invention.

A source LSR 610 includes a path computation unit 611, a backup LSP search unit 612, and a signaling unit 613. An intermediate LSR 620 includes a signaling unit 621. A destination LSR 630 includes a signaling unit 631. Each of the LSRs 610, 620, and 630 also includes other members to perform the functions of a label switching router, but the members only for functions related to the present invention are illustrated in FIG. 6.

The path computation unit 611 of the source LSR 610 computes a working path and a backup path and transmits a path setting request message 601 to the signaling unit 613 after computing either of the paths. On receiving the path setting request message 601 from the path computation unit 611, the signaling unit 613 transmits a label allocation request message 602 to the intermediate LSR 620. The backup LSP search unit 612 searches link configuration information added to a label mapping message received during setting of a working path, that is, it searches backup paths of working paths sharing links with the working path. Then, the backup LSP search unit 612 transmits the searched backup LSP information to the signaling unit 613. The signaling unit 613 adds the backup LSP information received from the backup LSP search unit 612 to the label allocation request message 602 when transmitting the label allocation request message 602 to the intermediate LSR 620 during setting of a backup path. When the source LSR 610 sets a backup path after setting a working path, a backup path band allocation unit 614 allocates a band for the backup path to a link connected to the source LSR 610. Here, the backup path band allocation unit 614 uses path information stored in its path information table 615. The signaling unit 621 of the intermediate LSR 620 adds link configuration information with respect to the intermediate LSR 620 to the received label allocation request message 602 and transmits the label allocation request message 602 with the link configuration information to a next intermediate LSR. Like the source LSR 610, the intermediate LSR 620 includes a backup path band allocation unit 622 and a path information table 623.

The signaling unit 631 of the destination LSR 630 adds entire link configuration information received through intermediate nodes to a label mapping message 603 and transmits the label mapping message 603 with the link configuration information to the source LSR 610 through the intermediate LSR 620.

Figure 7:
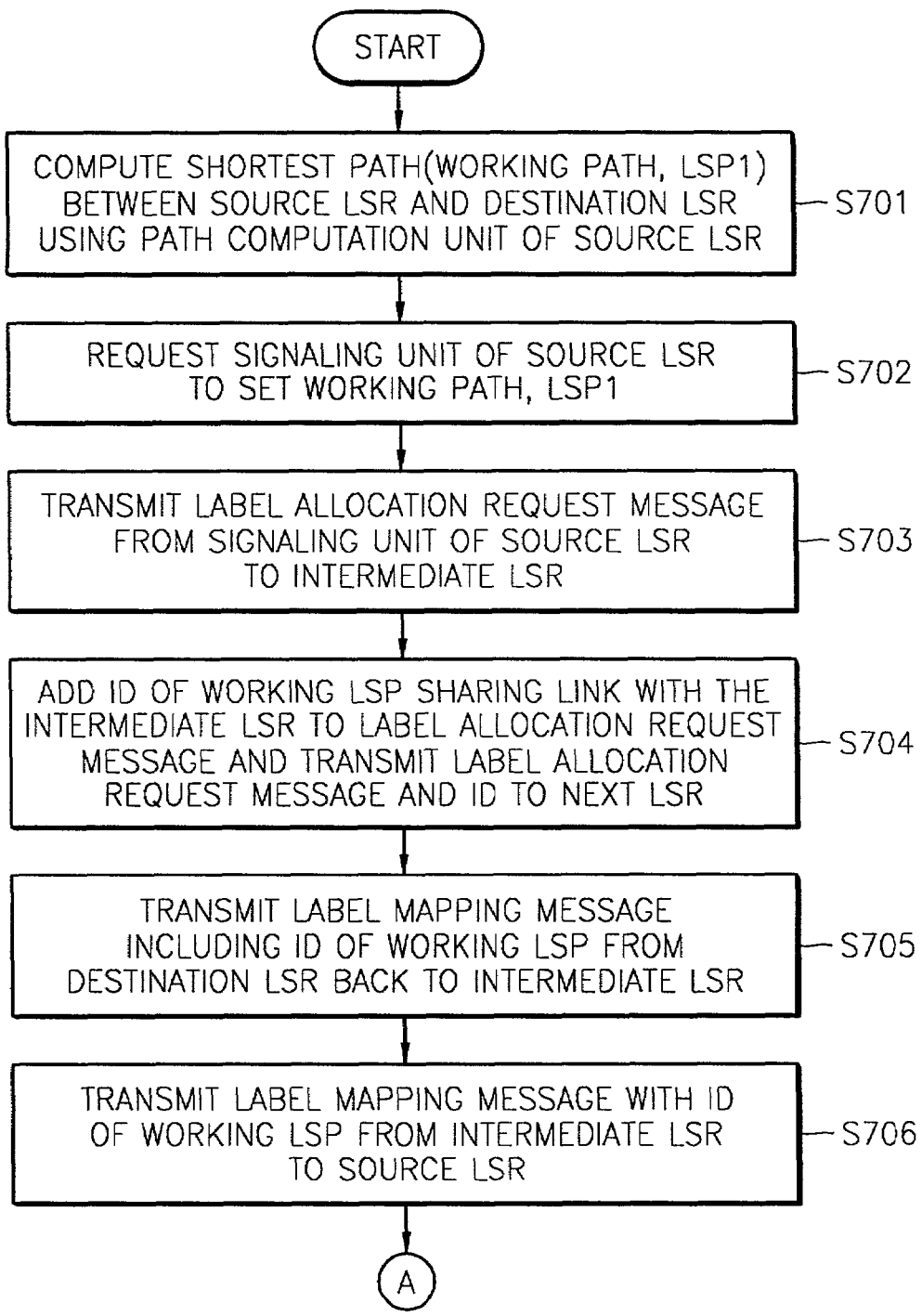
FIG. 7 is a flowchart of a procedure for setting a working path in a method for sharing a backup path according to the present invention.

A procedure for setting a working path in a method for sharing a backup path according to the present invention will be described with reference to FIG. 7.

An MPLS network is plotted on a directional graph G(V, E, W) having a weight indicating a network state. Here, the weight W=R(i, j) is a total of bands currently remaining for a link (i, j). All LSRs are composed into a set of a node V, and all links are composed into a set of a node E. A working path and a backup path include a source LSR, intermediate LSRs, and a destination LSR. A bandwidth required for the working and backup paths is represented by "b".

A path computation unit of a source LSR computes a working path, LSP1, that is the shortest path between the source LSR and a destination LSR in step S701. In other words, on the graph from which links having the weight W of less than "b" are removed, the shortest path between the source LSR and the destination LSR is computed and referred to as a working path LSP1. Next, the path computation unit transmits a path setting request message to a signaling unit to request setting of the working path LSP1 in step S702.

On receiving the path setting request message, the signaling unit designates each of LSRs included in the working path LSP1 as a router included in an explicit route and transmits a label allocation request message to an intermediate LSR in step S703.

On receiving the label allocation request message, the intermediate LSR adds the ID of a working LSP sharing a link with the intermediate LSR to the received label allocation request message and then transmits the label allocation request message with the ID to the next LSR in step S704.

The label allocation request message is finally transmitted to a destination LSR through intermediate LSRs performing the same operation as step S704 between the source LSR and the destination LSR. Then, the destination LSR generates a label mapping message including the ID of working LSP which has been added to the received label allocation request message by at least one intermediate LSR and transmits the label mapping message back to the intermediate LSR in step S705.

The intermediate LSR transmits the label mapping message including the ID of working LSP back to the source LSR in step S706. Through this procedure, the source LSR can have information about other working paths sharing the links with the working path LSP1 of the source LSR.

Figure 8:
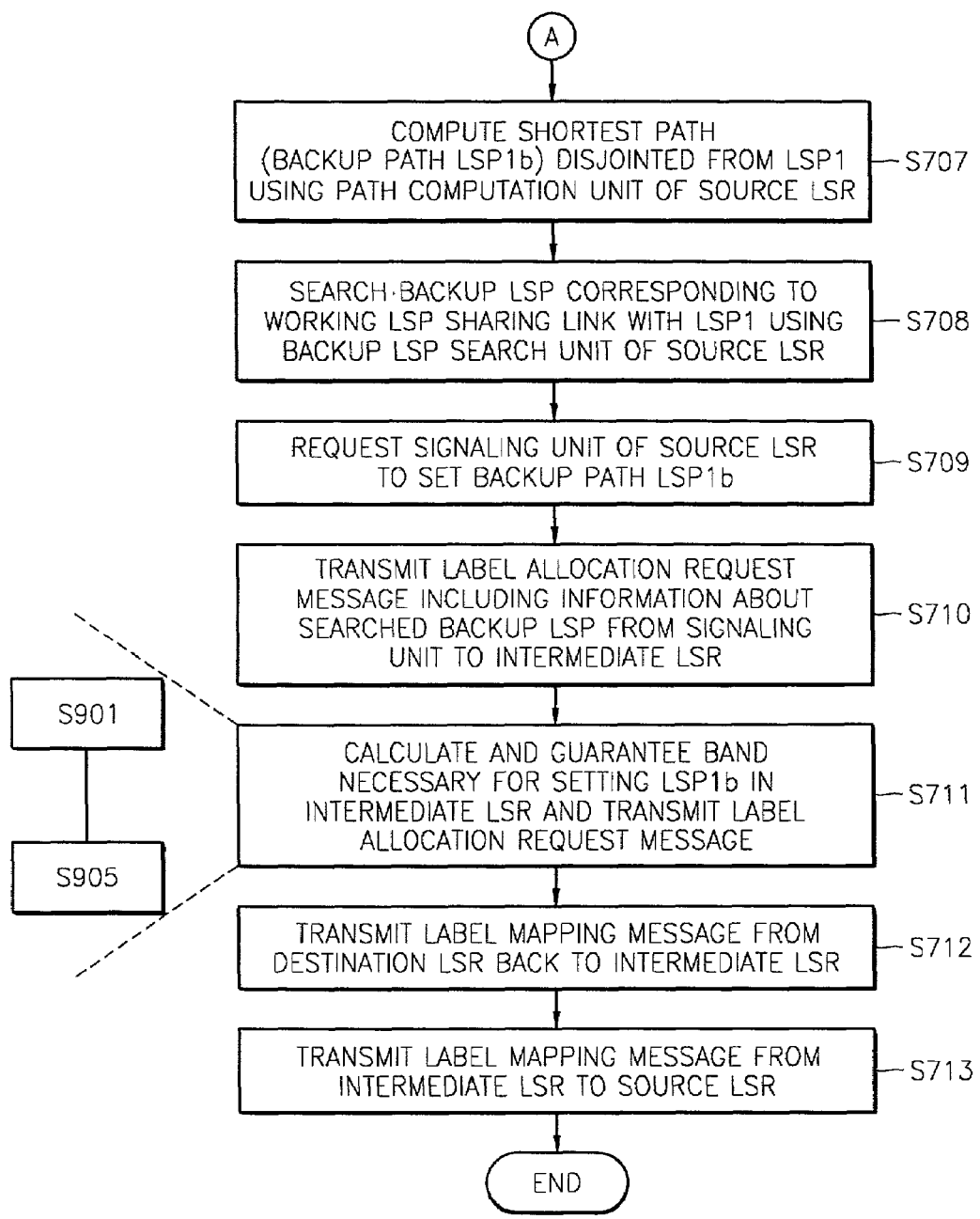
FIG. 8 is a flowchart of a procedure for setting a backup path in a method for sharing a backup path according to the present invention.

A procedure for setting a backup path in a method for sharing a backup path according to the present invention will be described with reference to FIG. 8.

On receiving the label mapping message, the path computation unit of the source LSR computes a backup path LSP1$b$ which is the shortest path that does not overlap with the working path LSP1 in step S707.

Next, a backup LSP search unit of the source LSR searches a backup LSP corresponding to a working LSP sharing a link with the LSP1 in step S708. Then, the path computation unit transmits a path setting request message for setting of the backup path LSP1$b$ to the signaling unit in step S709.

On receiving the path setting request message, the signaling unit designates each of LSRs on the LSP1$b$ as a route included in an explicit route and transmits a label allocation request message including information about the backup LSP searched by the backup LSP search unit to an intermediate LSR in step S710.

On receiving the label allocation request message, the intermediate LSR calculates and guarantees a band necessary for setting the LSP1$b$ and transmits the received label allocation request message to a next LSR in step S711.

Figure 9:
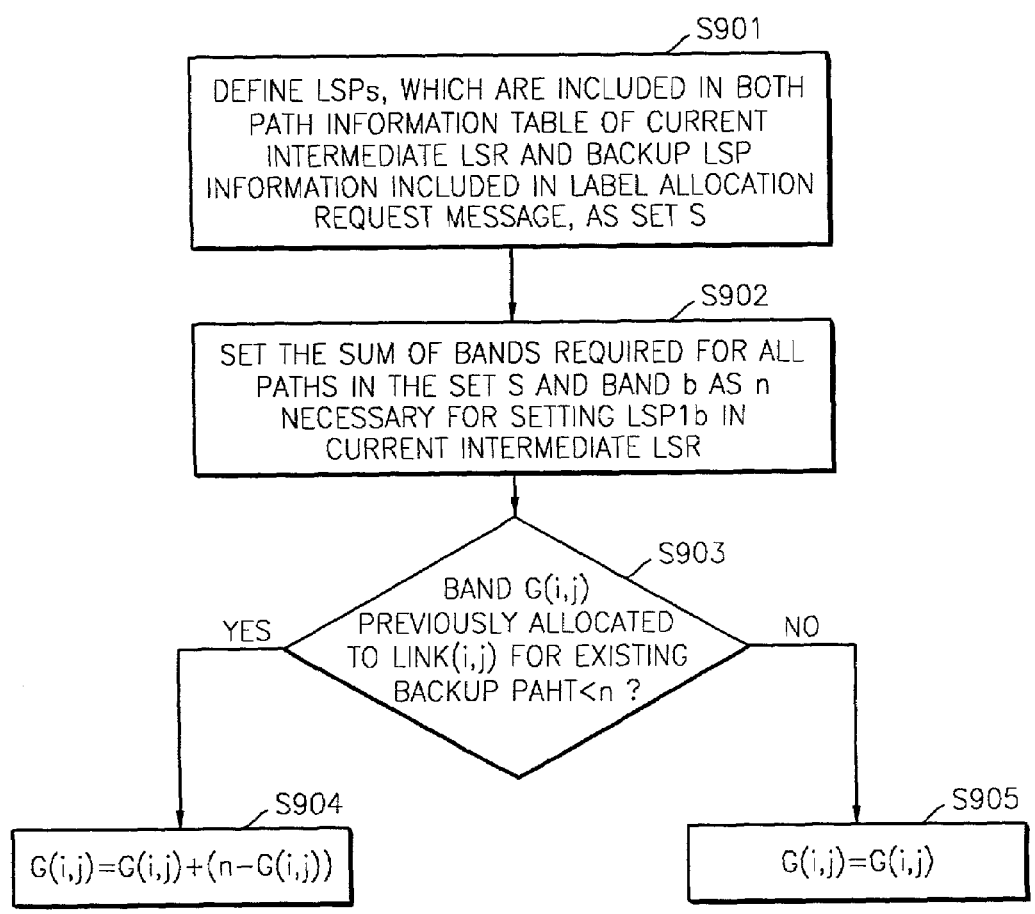
FIG. 9 is a flowchart of a procedure of calculating and guaranteeing a required band using an intermediate LSR in a method for sharing a backup path according to the present invention.

A method through which an intermediate LSR guarantees a band will be described with reference to FIG. 9.

An intermediate LSR finds out LSPs which are included in both its path information table and backup LSP information included in a received label allocation request message and defines them as a set S of backup LSPs in step S901. The sum of bands required for all paths in the set S and a band "b" required for the LSP1$b$ is set as a band "n" necessary for setting the LSP1$b$ in the current intermediate LSR in step S902. If a band G(i, j) previously allocated for at least one existing backup path is less than the band "n", a difference, n-G(i,j), is additionally guaranteed as a shared backup path band in step S904. If it is not, since the previously allocated band is enough for the LSP1$b$, additional band allocation is not performed in step S905.

In calculating a band in the MPLS network shown in FIG. 3, for the LSR1, since the L3$b$ is included in the path information table of the LSR1 and backup LSP information contains the L2$b$, L3$b$, and L4$b$, S={L3$b$}. Accordingly, a band required for the path within the set S is 10, and a band for the LSP1$b$ is 10, so the necessary band "n" is 20. However, a band G(LSR1, LSR5) previously allocated for the L3$b$ is 10, so the LSR1 additionally guarantees a band, n-G(LSR1, LSR5)=10, as a shared backup path band.

For the LSR5, since the L4$b$ and L10$b$ are included in the path information table of the LSR5 and backup LSP information contains the L2$b$, L3$b$, and L4$b$, S={L4$b$}. Accordingly, a band required for the path within the set S is 10, and a band for the LSP1$b$ is 10, so the necessary band "n" is 20. However, a band G(LSR5, LSR6) previously allocated for the L4$b$ and L10$b$ is 20, so the LSR5 is not necessary to guarantee an additional band since the necessary band "n" is equal to the previously allocated band.

For the LSR6, since the L11$b$ and L12$b$ are included in the path information table of the LSR6 and backup LSP information contains the L2$b$, L3$b$, and L4$b$, S={ }. Accordingly, a band required for the path within the set S is 0, and a band for the LSP1$b$ is 10, so the necessary band "n" is 10. However, a band G(LSR6, LSR1) previously allocated for the L11$b$ and L12$b$ is 20, so the LSR6 is not necessary to guarantee an additional band since the necessary band "n" is less than the previously allocated band.

With such method, an intermediate LSR can guarantee an optimal band based on backup LSP information.

If a necessary band is guaranteed in each intermediate LSR through the above procedure and the label allocation request message is transmitted to the destination LSR, the destination LSR transmits a label mapping message back to the intermediate LSR in step S712. The label mapping message is transmitted back through the intermediate LSR to the source LSR in step 713. Through the above procedure, a source LSR can set a backup path and allow an optimal band to be allocated to each of links included in the backup path.

The present invention can be realized as a code which is recorded on a computer readable recording medium and can be read by a computer. The computer readable recording medium may be any type on which data which can be read by a computer system can be recorded, for example, a ROM, a RAM, a CD-ROM, a magnetic tape, a floppy disc, or an optical data storage device. Alternatively, computer readable recording media are distributed among computer systems connected through a network so that the present invention can be realized as a code which is stored in the recording media and can be read and executed in the computers.

As described above, the present invention allocates an optimal band to each of links included in a backup path by calculating a band using information, which is obtained during setting of a working path, about other working paths sharing links with the working path when the backup path is set, thereby efficiently managing network resources without wasting them.

What is claimed is:

1. A method for sharing a backup path in a MultiProtocol Label Switching (MPLS) network, the method comprising the steps of:

acquiring link configuration information of links included in a working path when the working path is set between a source node and a destination node; and allocating bands for a backup path using the link configuration information when the backup path is set between the source node and the destination node, wherein the step of allocating the bands for the backup path comprises:

a step in which the source node computes the backup path corresponding to the set working path;

a step in which the source node transmits a label allocation request message including information about the backup path of at least one other working path sharing a link with the set working path to an intermediate node included in the currently set backup path; and a step in which the intermediate node allocates a band for the currently set backup path using the received information about the backup path of the at least one other working path sharing a link with the set working path.

2. The method of claim 1, wherein the step of acquiring the link configuration information is performed using a label allocation request message and a label mapping message.

3. The method of claim 1, wherein the link configuration information is information about at least one other working path sharing the links with the currently set working path.

4. The method of claim 1, wherein the step of allocating the bands for the backup path is performed using information about a backup path of at least one other working path sharing the links with the currently set working path and information about a backup path previously allocated to each of the links of the currently set backup path.

5. A method for sharing a backup path in a MultiProtocol Label Switching (MPLS) network, the method comprising the steps of:

setting a working path between a source node and a destination node; and allocating bands for a backup path of the set working path taking into account a backup path of other working path sharing a link with the set working path when the backup path of the set working path is set, wherein the step of allocating the bands for the backup path comprises:

a step in which the source node computes the backup path corresponding to the set working path;

a step in which the source node transmits a label allocation request message including information about the backup path of at least one other working path sharing a link with the set working path to an intermediate node included in the currently set backup path; and a step in which the intermediate node allocates a band for the currently set backup path using the received information about the backup path of the at least one other working path sharing a link with the set working path.

6. The method of claim 5, wherein the step of setting the working path comprises:

a step in which the source node transmits a label allocation request message to an intermediate node included in the working path;

a step in which the intermediate node adds information about at least one other working path, which shares a link with the intermediate node, to the received label allocation request message and transmits the label allocation request message with the added information to the destination node; and a step in which the destination node receives the label allocation request message with the added information about the at least one other working path, adds the received information about the at least one other working path to a label mapping message, and transmits the label mapping message with the information about the at least one other working path back to the source node through the intermediate node.

7. The method of claim 1, wherein the step of allocating a band for the currently set backup path is performed using information about a backup path previously allocated to the intermediate node and the information included in the received label allocation request message.

8. The method of claim 1, wherein the step of allocating a band for the currently set backup path comprises additionally allocating a band corresponding to a difference, i.e., (a necessary band—a band previously allocated for an existing backup path), when the band previously allocated for the existing backup path is less than the necessary band that is the sum of a band for a path, which is included in both a set of backup paths previously allocated to the intermediate node and the information included in the label allocation request message, and a band for the currently set backup path.

9. A label switching router for setting a backup path in a MultiProtocol Label Switching (MPLS) network, the label switching router comprising:
a path computation unit for computing a working path and a backup path and transmitting a path setting request message to a signaling unit;
a backup path search unit for receiving a label mapping message including information about at least one other working path sharing at least one link with the currently computed working path and searching a backup path of the at least one other working path using information about the at least one other working path;
a signaling unit for transmitting a first label allocation request message for setting the currently computed working path and a second label allocation request message which includes information about the backup path searched by the backup path search unit for setting the currently computed backup path; and
a backup path band allocation unit for allocating a band for the currently computed backup path using the information about the backup path searched by backup path search unit and information about a path previously allocated to the label switching router, wherein the band path allocation unit comprises:
a source node which computes a backup path corresponding to the set working path; and
the source node transmits a label allocation request message including information about the backup path of at least one other working path sharing a link with the set working path to an intermediate node included in the currently set backup path; and
wherein the intermediate node allocates a band for the currently set backup path using the received information about the backup path of the at least one other working path sharing a link with the set working path.

10. A system for setting a backup path in a MultiProtocol Label Switching (MPLS) network, the system comprising:
a source router for receiving a label mapping message including information about at least one existing working path sharing at least one link with a current working path, searching information about a backup path of the at least one existing working path, adding the information about the searched backup path to a label allocation request message for setting a backup path, and transmitting the label allocation request message with the information to an intermediate node; and
an intermediate router for allocating a band for the backup path to be set using the information added to the label allocation request message received from the source router and path information previously stored therein,
wherein the intermediate router path comprises:
a source node which computes the backup path corresponding to the set working path; and
the source node transmits a label allocation request message including information about the backup path of at least one other working path sharing a link with the set working path to an intermediate node included in the currently set backup path; and
wherein the intermediate node allocates a band for the currently set backup path using the received information about the backup path of the at least one other working path sharing a link with the set working path.

11. A computer readable recording medium in which a program for allowing the method of any one of claims 1 through 9 to be executed on a computer is recorded.

* * * * *